US007683285B2

(12) United States Patent
Haselberger et al.

(10) Patent No.: US 7,683,285 B2
(45) Date of Patent: Mar. 23, 2010

(54) METHOD OF SORTING FLAT MAIL ITEMS

(75) Inventors: Nikolaus Haselberger, Radolfzell-Markelfingen (DE); Eberhard Mandler, Reichenau (DE); Andre Rompe, Berlin Kaulsdorf (DE); Holger Schererz, Rehfelde (DE); Wolf-Stephan Wilke, Constance (DE); Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/437,963

(22) Filed: May 8, 2009

(65) Prior Publication Data

US 2009/0211953 A1 Aug. 27, 2009

Related U.S. Application Data

(60) Division of application No. 10/547,924, filed on Oct. 30, 2006, and a continuation of application No. PCT/EP2005/005713, filed on May 27, 2005.

(30) Foreign Application Priority Data

Jul. 9, 2004 (DE) ....................... 10 2004 033 564

(51) Int. Cl.
*B07C 5/00* (2006.01)
*G06K 9/00* (2006.01)

(52) U.S. Cl. ....................................... 209/584; 209/900

(58) Field of Classification Search ................. 209/584, 209/900, 583; 193/8; 414/331.03, 331.05; 198/347.1, 347.4, 418.6
See application file for complete search history.

(56) References Cited

U.S. PATENT DOCUMENTS

| | | | |
|---|---|---|---|
| 3,300,066 | A | 1/1967 | Henig et al. |
| 5,462,268 | A | 10/1995 | Remy et al. |
| 5,994,657 | A | 11/1999 | Maier et al. |

(Continued)

FOREIGN PATENT DOCUMENTS

| | | | |
|---|---|---|---|
| AU | 773720 | B2 | 6/2004 |

(Continued)

*Primary Examiner*—Patrick H Mackey
*Assistant Examiner*—Mark Hageman
(74) *Attorney, Agent, or Firm*—Laurence A. Greenberg; Werner H. Stemer; Ralph E. Locher

(57) ABSTRACT

A sorting device has at least one mail item buffer receptacle, a number of storage pockets for mail items arranged one after another and circulating continuously in a conveyor belt and moved past one or more loading stations. Below straight transfer sections of the conveyors fixed intermediate storage receptacles open at the top are arranged to accept one or more mail items from the loaded storage pockets to be opened under control in the transfer sections. On a transport path below the intermediate storage receptacles there are also continuously circulating mail item containers open at the top as sorting end points assigned to the destination addresses or destination address groups. In the mail item containers the mail items are unloaded downwards in a horizontal position in accordance with their read destination address through controllable opening of the relevant intermediate storage receptacle at the point, in which the mail item container assigned to the address is located in the corresponding position below the intermediate storage receptacle with mail items for this mail item container.

7 Claims, 3 Drawing Sheets

U.S. PATENT DOCUMENTS

| | | | |
|---|---|---|---|
| 6,068,109 | A | 5/2000 | Schuster |
| 6,126,017 | A | 10/2000 | Hours |
| 6,227,378 | B1 | 5/2001 | Jones et al. |
| 6,595,346 | B1 | 7/2003 | Advani et al. |
| 7,170,024 | B2 | 1/2007 | Burns et al. |
| 7,397,010 | B2 | 7/2008 | Wilke |
| 2002/0125177 | A1 | 9/2002 | Burns et al. |
| 2005/0252836 | A1 | 11/2005 | Burns et al. |
| 2006/0102529 | A1 | 5/2006 | Wilke |

FOREIGN PATENT DOCUMENTS

| | | | |
|---|---|---|---|
| CA | 2379783 | A1 | 2/2001 |
| EP | 0 608 161 | A1 | 7/1994 |
| EP | 0 820 818 | A1 | 1/1998 |
| EP | 0851793 | B1 | 8/1999 |
| EP | 0 949 015 | A2 | 10/1999 |
| EP | 1765525 | B1 | 8/2008 |
| WO | 97/10904 | A1 | 3/1997 |
| WO | 01/08817 | A1 | 2/2001 |

METHOD OF SORTING FLAT MAIL ITEMS

CROSS-REFERENCE TO RELATED APPLICATION

This is a divisional application of copending patent application Ser. No. 10/547,924, filed Oct. 30, 2006; which was a continuation, under 35 U.S.C. §120, of International application PCT/EP2005/005713, filed May 27, 2005; the application also claims the priority, under 35 U.S.C. §119, of German patent application DE 10 2004 033 564.8, filed Jul. 9, 2004; the prior applications are herewith incorporated by reference in their entirety.

BACKGROUND OF THE INVENTION

Field of the Invention

The present invention relates to sorting device for flat mail items featuring at least one input station, one mail item singulation unit in each case and a subsequent transport device for transporting the singulated mail items past process devices such as readers, barcode printers to a loading station of an mail item buffer receptacle, with the buffer receptacle consisting of a number of storage pockets circulating in a conveyor past the loading stations which are loaded with the mail items in the loading stations.

For sorting flat mail items, such as letters, postcards, circulars and such like in accordance with the distribution information specified on their surface the known method is to put these items into special pocket-shaped containers, transport them and output them in a controlled way.

Thus a sorting device is known from EP 0 608 161 A1 in which flat objects are transported sideways by means of channel-shaped, fixed-position feeding device from outside into storage pockets. These storage pockets circulating in a closed loop are moved horizontally past the feeding device and, when flaps are explicitly opened in accordance with the sort specifications, they fall into sorting containers located below the flaps. To feed the items securely into the moving sorting pockets the items must either be moving very quickly in the feed devices, which can result in damage when the items are decelerated in the containers, or the speed of the storage pockets is very slow or the containers come to a halt while the items are fed into them, which means that the throughput of the machine is reduced.

To arrange the items in a specific order a solution is known (EP 820 818 A1) which uses an intermediate receptacle consisting of storage pockets circulating in a conveyor with a least two semicircular conveyor sections on a conveyor device, each of which accepts a mail item and can output this item on command into the actual stacker. In this case all items to be arranged are initially accommodated in any sequence in storage pockets of the intermediate receptacle. Then the items are taken from the storage pockets of the intermediate receptacle and transferred into the stackers such that in the latter they are in the intended order. The stackers which are open at the top are located along the straight sections of the conveyor below the storage pockets.

To improve the feeding of the items into the storage pockets, the end section of the means of transport is embodied in accordance with WO 97/10904 so that it can swivel, so that when the relevant item is being fed in this end section is swiveled at essentially the same speed and in the same direction as the moving storage pocket and is swiveled back at the end of the feeding-in process.

The throughput of this sort device is limited by the throughput of the circulating storage pockets. An increase in throughput can theoretically only be achieved by increasing the speed and/or reducing the spacing of the transport system of the storage pockets. As described however (moving the items into the storage pockets) this is only possible to a very limited extent.

Also known is a sorting device (EP 0 949 015 A2) with a number of input units, at least one mail item buffer with continuously circulating storage pockets, mail item containers as sorting end points which are filled from the lowest mail item buffer receptacle and with a feeder and removal device for mail item containers. In this case it is possible to make do with fewer sorting end points than there are sorting destinations.

Furthermore a sorting device is known from U.S. Pat. No. 6,126,017 A with a continuously circulating mail item buffer receptacle, fixed intermediate receptacles arranged below this and fixed, but exchangeable mail item containers arranged below these.

SUMMARY OF THE INVENTION

The object of the invention is to create a sorting device with circulating storage pockets which is embodied so that sorting according to the singulation sequence in a sort run within the time window provided is also possible and with which the effort for automatic changeover of the mail item containers and for measuring their occupancy levels can be reduced.

In accordance with the invention the objects are achieved with the method according to the claims.

Below straight transfer sections of the conveyors of the mail item buffer receptacle or receptacles there are fixed intermediate storage receptacles open at the top to accept one or more items from the loaded storage pockets controlled to be opened in the transfer sections. Storage containers open at the top also run continuously on a transport path below the intermediate receptacles as sorting end points assigned to the destination address or destination address groups, into which the items can be unloaded downwards in a horizontal position in accordance with their read destination address by controllable opening of the relevant intermediate receptacles at the point at which the item container corresponding to the address is located in a corresponding position below the intermediate receptacle with items for this item container. The item container transport path features at least one device for feeding in empty item containers and at least one device for removing filled item containers. The locally fixed intermediate storage receptacles allow relatively high circulation speeds since the relative speeds for the transfers are only the pocket frame speed or the mail item container speed in each case. The pocket frame speed in particular has no effect on the stacking behavior in the container (decoupling). The number of intermediate receptacles is significantly lower than the number of storage pockets of the mail item buffer since the former are used a number of times during the circulation. This means that increased, but still relatively low outlay can improve stacking quality in the embodiment of the intermediate receptacles.

Advantageous embodiments of the invention are presented in the dependent claims.

To keep the time that the item is present in the intermediate receptacle short and thereby to use the intermediate receptacle a number of times during a pocket frame circulation of the mail item buffer, it is advantageous for the assignment and transfer of the read mail item to the assigned item container to occur in following steps:

Determining the sort destination for each of the mail items located in a storage pocket, Computing the next possible point at which the storage pocket with the relevant mail item will meet the assigned mail item container in a transfer section on the basis of the geometrical ratio and the speed of the storage pockets and the mail item containers, Determining the actual transfer point in the transfer section by correcting the computed meeting point based on the time for which the mail item needs to remain in the intermediate receptacle, Selection of an intermediate receptacle capable of accepting the mail item at the latest at the transfer point for each item and transfer of the item by opening the storage pocket if it is located over the selected intermediate receptacle and opening the intermediate receptacle if the assigned mail item container is located below the intermediate receptacle.

To protect the mail items as they are entering and leaving the intermediate receptacles it is advantageous to embody the intermediate receptacle as a funnel curved in the transport direction of the mail item container.

It is advantageous if in the transfer sections the storage pockets and the mail item containers are moving in the opposite directions, which leads to an increase in the throughput.

Furthermore it is advantageous if, for sorting in accordance with the distribution sequence, a number of mail items are loaded into an intermediate receptacle in a specific order in a sorting run, whereby this process must be completed before the assigned mail item container has reached this intermediate receptacle. This pre-sorting allows sorting in areas with many singulation halt points at a high rate of throughput, since additional circulations of the mail item containers for achieving the required sequence are avoided.

For good stacking of the mail items in the containers it is advantageous for the mail item containers to be tilted in their transport direction.

If with specific mail items the destination address cannot be read by the time the item has reached the first transfer section, these storage pockets advantageously pass through a fixed number of transfer sections and, if in this time the destination address could still not be read, these mail items are fed into a mail item container for unread items.

To achieve particularly high throughput, advantageous developments provide for a number of mail item buffers of which the conveyors feature straight transfer sections in each case with the intermediate receptacles and two curved sections, of which one is connected to the loading stations, arranged next to each other. The transport path for the circulating mail item containers is routed below the mail item buffers in a serpentine shape so that the mail item containers transported below the transfer sections of the mail item buffers each move in the opposite direction of transport to the storage pockets.

In a useful embodiment the storage pockets are open at the sides and are routed with their open sides past the end sections of the transport devices. This enables the transport direction from the input station and the mail item orientation to be retained right into the storage pocket.

In a further advantageous embodiment, controllable, stationary actuators assigned to the buffers for opening the storage pockets as well as for opening the intermediate storage receptacle and corresponding closure elements are arranged along the transfer sections.

To advantageously determine the height of the batch of mail items a sensor arrangement to determine the batch height is disposed above the transport path of the containers after the transfer sections and before the device for feeding the mail item containers into the transport path or removing them from it. By contrast a corresponding sensor previously had to be arranged at each endpoint or the stack height had to be calculated from the measured thicknesses of the individual items.

The invention is explained in more detail below in an exemplary embodiment with reference to the drawing.

DETAILED DESCRIPTION OF THE INVENTION

Figure 1:
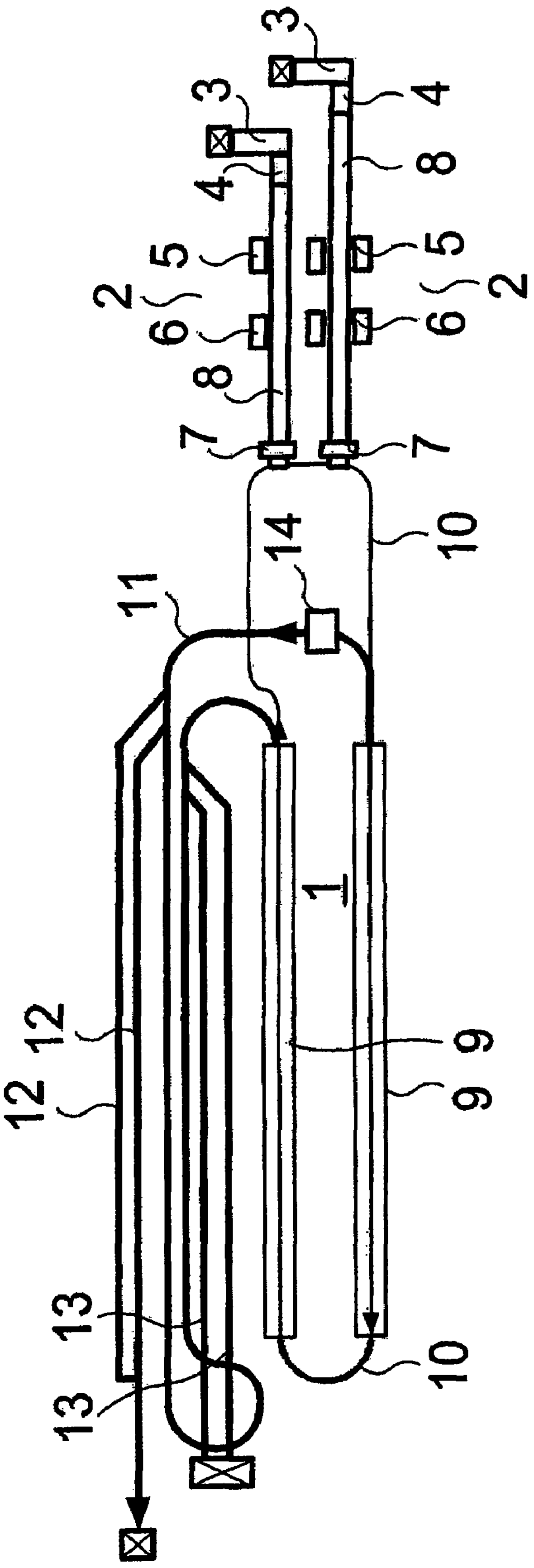
FIG. 1 a schematic view from above of a sorting device with a mail item buffer and two input stations, FIG. 2 a schematic side view of the storage pockets, storage containers and mail item containers, FIG. 3 a schematic diagram of the pre-sorting of a number of mail items in the order of singulation into an intermediate receptacle.
Figure 2:
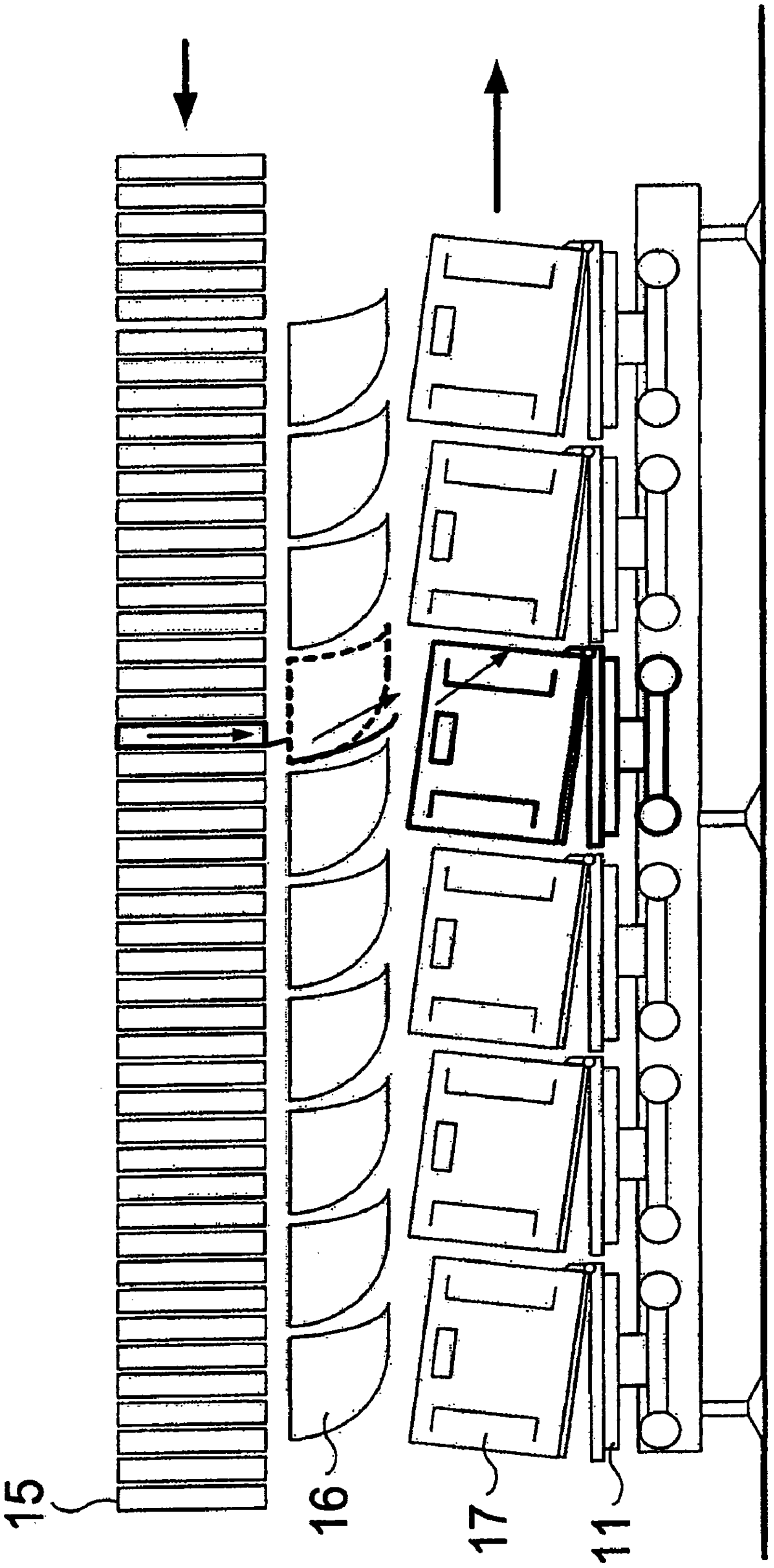

As can be seen from FIG. 1 there is a mail item buffer 1. It consists of a storage pockets 15 arranged one after the other in a continuously circulating conveyor, controlled to be unloaded downwards by means of an opening mechanism, said storage pockets being disposed to accept mail items in a vertical position. Each conveyor consists of two straight transfer sections 9 and between them two curved connecting sections 10. The storage pockets 15 are open to the outside at their sides and on a curved section 10 of the conveyor are located two loading stations 7, in which mail items are transported individually through the side openings into the empty storage pockets 15. The loading stations 7 receive the mail items individually one after another from an input unit 2 in which the mail items are singluated from the stacks of items by means of a mail item singulation device 3, aligned in an alignment path 4 and then transported past process devices such as an address reader for 5 or a barcode printer 6 for example, to apply identification codes, with the aid of a transport device 8 to the loading station 7. Since two loading stations 7 next to each other feed mail items into the storage pockets 15, the speed of circulation of the pocket edge must be high enough, so that matched to the performance of the mail item singulation devices 3 after passing through both transfer sections 9, the read mail items are transferred to the fixed intermediate storage receptacle 16 arranged in a fixed position directly under the pocket edge in the transfer sections 9.

Below the intermediate storage receptacle 16 mail item containers 17 open at the top and acting as sorting end points are also moved in continuous circulation on a transport path 11. This is done so that the mail item containers 17 are transported directly below both straight transfer sections 9 of the mail item buffer receptacle 1 in the opposite direction to the feed direction of the storage pockets 15, i.e. the transport path 11 runs in a serpentine shape. In this case it is also possible in a way not shown, by arranging the input processes in parallel with a number of mail item buffers 1, which is not possible with the prior art with stationary end points to the same extent, to further increase the throughput of the sorting device. The storage pockets 16 and the intermediate storage receptacle 17 are opened in each case by controlled fixed actuators, each assigned to the intermediate storage receptacles 17 but not shown in the diagram in order to reduce its complexity. Furthermore corresponding closing mechanisms are provided. So that the time for which the mail items remain in the intermediate storage receptacles 16 is kept as short as possible and thereby their number can be kept small by multiple use, the actuators are operated on the basis of the following sequence:

Determination of the sort destination for each mail item located in a storage pocket 15 in each case, Calculation of the next possible point at which the storage pocket 15 with the relevant mail item will meet the assigned mail item container 17 in a transfer section 9 on the basis of the geometrical circumstances and the speed of the storage pockets 15 and mail item containers 17, Determination of the actual transfer point into the transfer section 9 by correction of the calculated meeting point based on the time for which the mail item needs to remain in the intermediate storage receptacle 16, Selection of an intermediate storage receptacle 16 which is capable of accepting the item available at the latest at the transfer point for each mail item and transfer of the mail item by opening the storage pocket 15 if it is located over the selected intermediate storage receptacle 16 and opening of the intermediate storage receptacle 16 if the assigned mail item container 17 is located under the intermediate storage receptacle 16.

To measure how full the mail item container 17 is and on this basis to determine when the filled mail item container 17 must be removed and replaced by an empty mail item container 17, a sensor arrangement 14 for measuring the height of the stack, e.g. as a laser sensor, is located above the transport path 11 after the mail item buffer receptacle or receptacles 1 and before the output device 12. If the maximum stack height is not yet reached, the associated mail item container 17 continues to be circulated. If the height is reached or exceeded the container is removed.

Figure 3:
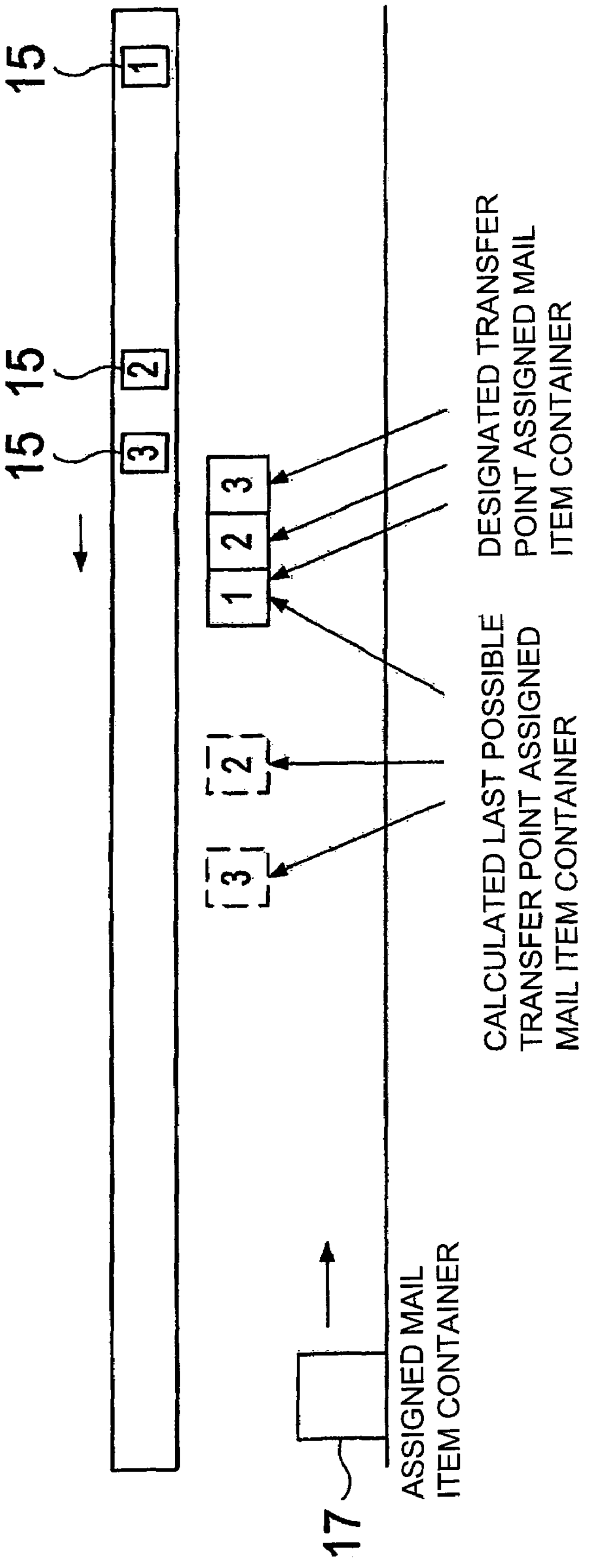

If the mail items are to be sorted according to the order of singulation in a sorting run, as shown schematically in FIG. 3, within the framework of the available times up to the last possible transfer of the mail items from the storage pockets 15 into the intermediate storage receptacle 16 a pre-sorting with overtaking processes can be undertaken, with one or more mail items being stored in an intermediate storage receptacle 16 in this case. This makes it possible to store sub-sequences in the intermediate storage receptacle. This means that additional circuits by the corresponding mail item containers 17 can be avoided. As can be seen from FIG. 3, there are three mail items in the sequence shown 3,2,1 in the storage pockets 15. They are however to be stored in the reverse order in the container 17 shown. Based on the position and speed of the mail item container 17 and the corresponding storage pockets 15, the time frame available is calculated by determining the last possible transfer point of the mail items into destination containers, taking into account the time that they are in the intermediate receptacle 16. Then the three mail items are loaded in the reverse direction into a free intermediate storage receptacle 16 within the time window determined and from this receptacle into the mail item container 17.

The invention claimed is:

1. A method for arranging and transferring mail into a mail item container, with a sorting device, the mail being located in a storage pocket, the method comprising the steps of:

determining a sorting destination for each mail item located in the storage pocket;

calculating a next possible meeting point of the storage pocket with mail items and with assigned mail item container, in a transfer section in accordance with geometrical circumstances and speed of the storage pockets and the mail item containers;

determining an actual transfer point in the transfer section by correcting the calculated meeting point in accordance with a time in which mail items need to remain in an intermediate storage receptacle;

selecting an intermediate receptacle capable of accepting the mail item at a transfer point for each item; and transferring the item by opening the storage pocket when it is located over the selected intermediate receptacle and opening the intermediate receptacle when the assigned mail item container is located below the intermediate receptacle.

2. The method according to claim 1, which comprises moving the mail item containers transported along in the transfer sections directly below the intermediate storage receptacle in an opposite direction of transport to the storage pockets.

3. The method according to claim 2, which comprises, for sorting according to a singulation sequence in a sort run, arranging one or more mail items to be loaded with overtaking processes in a specific sequence into an intermediate storage receptacle such that the overtaking process is completed before the assigned mail items container has reached the intermediate storage receptacle.

4. The method according to claim 3, which comprises inclining the mail item containers in a direction of transport.

5. The method according to claim 1, which comprises, if the destination address has not yet been read by the time the storage pocket with a mail item arrives for a first time in a transfer section, passing the storage pocket through a defined number of transfer sections until the storage pocket is to be opened and, if the destination address could still not be read, removing the mail item from the storage pocket and placing the mail item in a mail item container for mail items which could not be read.

6. The method according to claim 1, which comprises providing storage pockets with side-openings and moving the storage pockets in the loading stations with the side-openings towards the end sections of the transport devices.

7. The method according to claim 1, which comprises monitoring a height of a stack in the mail item containers above the transport path of the mail item containers following the transfer sections and before a device for removing the mail item container from the transport path, and, if a predetermined stack height is exceeded, removing the relevant mail item container.

* * * * *